Patented Nov. 7, 1922.

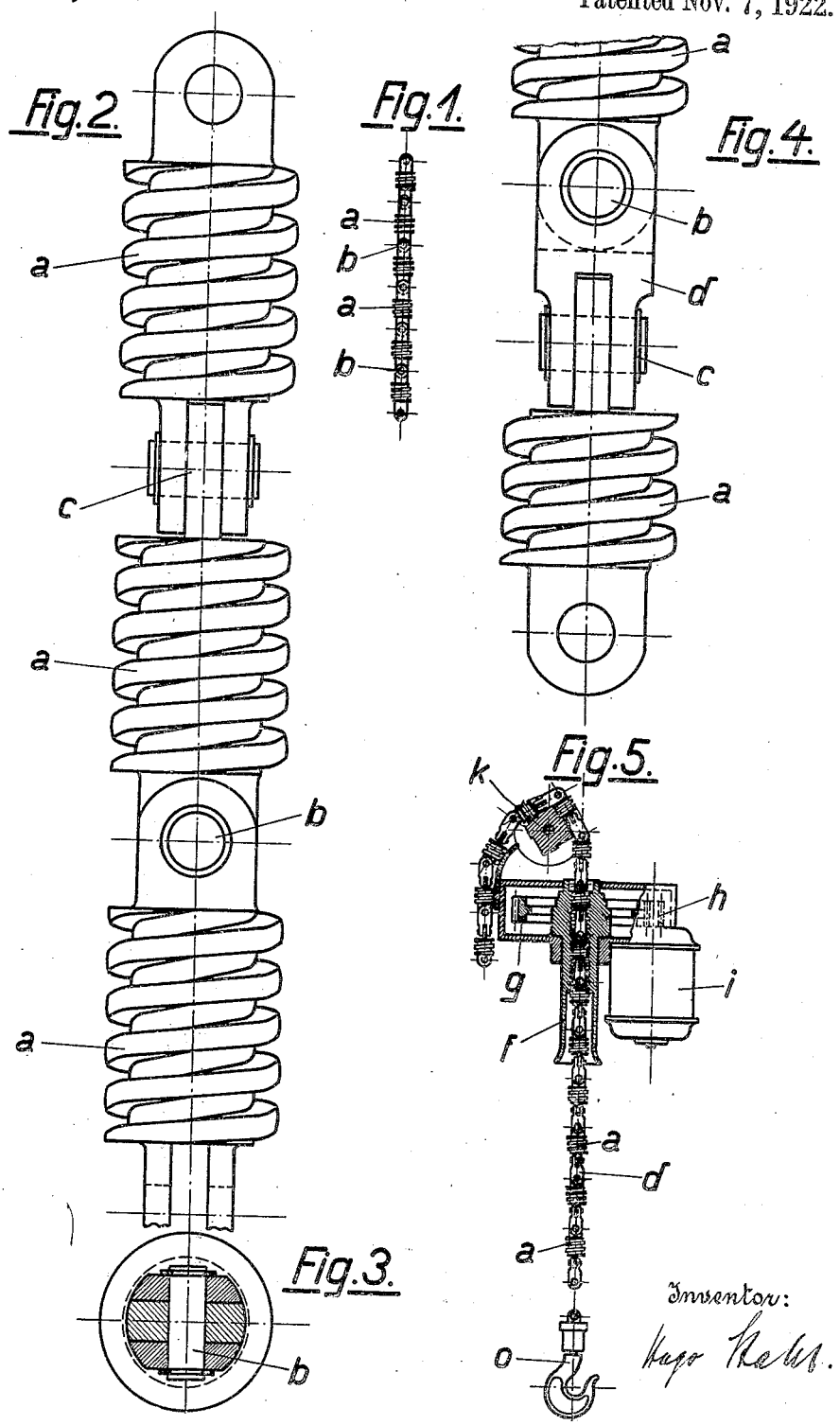

1,434,457

UNITED STATES PATENT OFFICE.

HUGO STAHL, OF STUTTGART, GERMANY.

HOISTING DEVICE.

Application filed February 28, 1920. Serial No. 362,173.

*To all whom it may concern:*

Be it known that I, HUGO STAHL, a citizen of the German Empire, and resident of Stuttgart, Württemberg, German Empire, have invented certain new and useful Improvements in Hoisting Devices (for which I have filed applications in Germany, Feb. 3, 1919, patent No. 318,854, and in Switzerland, Mar. 8, 1919, Patent No. 82,833), of which the following is a specification.

My invention refers to hoisting devices and more especially to a novel type of lifting device especially adapted to be operated by electricity. Its particular object is to provide a device of this sort of especially low weight.

This is obtained in the first line by employing a chain, rope or other suspension member fashioned so as to form part of a power transmission gear of a simple type, said gear being driven by a motor running at high speed, such as an electromotor. The preferred form of a suspension member according to my invention is a chain provided with screw threaded members which combine to form a flexible screw spindle, a nut driven by a motor encircling the spindle and lifting it. Owing to its flexibility a screw spindle of this kind, no matter whether it has the form of a chain or a rope, is free to bend as soon as it has passed through the nut, so that no free space to speak of need be reserved for the spindle above the nut.

In the drawings affixed to this specification and forming part thereof several modifications of a lifting device according to my invention are illustrated. Fig. 1 is an elevation of one form of a lifting chain; Fig. 2 is an elevation and Fig. 3 a cross-section, drawn to a bigger scale, of another form. Fig. 4 is an elevation of two adjoining members of a third form of chain. Fig. 5 is a vertical section of a lifting device provided with a chain according to Fig. 4.

Referring to Fig. 1 the members $a$, $a$ of the chain have the form of short cylindrical screw-threaded spindles connected with each other by link pins $b$, $b$. It is clear that a chain of this sort as soon as some of its members have passed through a nut such as $f$ (Fig. 5), will be free to bend at right angles to the pins $b$. In order to allow the chain to bend in more than one direction, the screw-threaded members $a$, $a$ of the chain shown in Fig. 2 are linked to each other by pins $b$, $c$ standing alternately at right angles to each other. In order to adapt the chain to bend in all directions, a universal joint is inserted between each pair of links as shown in Fig. 4, where two links with pins $b$ and $c$ at right angles to each other are inserted between each pair of chain members $a$, $a$.

A chain of this latter type is shown in Fig. 5 as passing through a nut $f$ forming the hub of the gear wheel $g$ gearing with a toothed wheel $h$ on the shaft of an electromotor $i$. The nut $f$ has the form of an internally screw-threaded cylinder with its lower end shaped like a funnel so as to offer an easy entrance for the ascending chain members.

The chain is prevented from rotating with the nut $f$ by its upturned upper end being supported by a rotatable drum $k$.

I wish it to be understood that it is not necessary that the suspension member be shaped in accordance with my invention all over its length. An ordinary chain, rope or other suspension member may be inserted between the hook $o$ and the chain $a$.

Although I have shown and described my invention as applied to a lifting device proper, that is to say to an appliance designed for transporting goods in a vertical direction, my invention is not limited to such appliances but may be used with equal advantage in combination with transporting devices of some other type.

I claim:

1. A chain comprising links carrying at least one uninterrupted screw thread turn.

2. A chain comprising in combination a plurality of links and a screw spindle with at least one uninterrupted turn forming part of each link.

3. A chain comprising in combination a plurality of links, link pins alternately disposed at right angles to one another and a screw spindle with at least one uninterrupted turn forming part of each link.

4. In a lifting device in combination, a chain, means for preventing said chain from rotating about its longitudinal axis, a plurality of uninterrupted screw thread turns on said chain and means cooperating with a vertically extending portion of said chain for exerting a pull on said chain.

5. In a lifting device in combination, a chain, means for preventing said chain from rotating about its longitudinal axis, a plurality of uninterrupted screw thread turns on said chain, a nut surrounding a vertically extending portion of said chain and means for supporting and for rotating said nut.

6. In a lifting device in combination, a wheel adapted to rotate about a vertical axis, means for rotating said wheel, the hub of said wheel being provided with internal screw threading, a chain passing through said hub, means for preventing said chain from rotating about its longitudinal axis, and a plurality of uninterrupted screw thread turns on said chain.

7. In a lifting device in combination, a wheel adapted to rotate about a verticle axis, a supporting frame carrying said wheel, an electromotor on said frame adapted to rotate said wheel, the hub of said wheel being provided with internal screw threading, a chain passing through said hub, means for preventing said chain from rotating about its longitudinal axis, and a plurality of uninterrupted screw thread turns on said chain.

In testimony whereof I affix my signature.

Dr.-Ing. HUGO STAHL.